Figure 1:
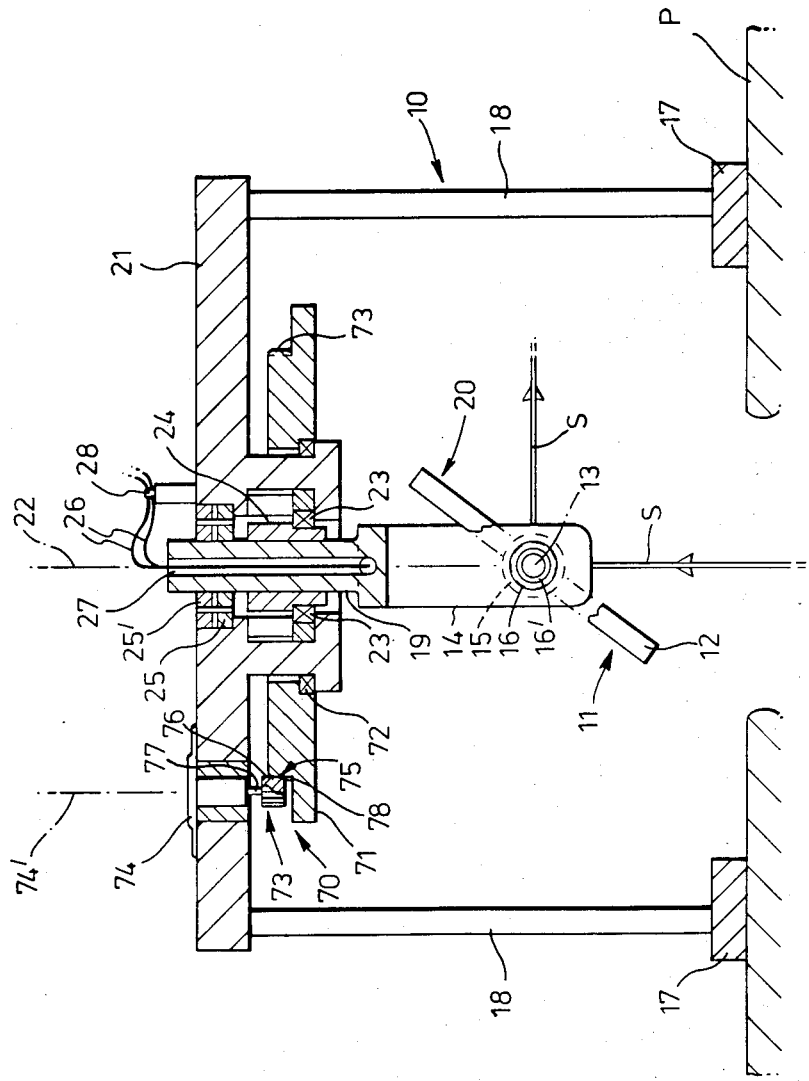

United States Patent [19]

Brignall

[11] Patent Number: 4,638,221
[45] Date of Patent: Jan. 20, 1987

[54] REACTION FORCE COMPENSATOR

[75] Inventor: Nicolas L. Brignall, Edinburgh, Scotland

[73] Assignee: Ferranti plc, London, England

[21] Appl. No.: 796,117

[22] Filed: Nov. 8, 1985

[30] Foreign Application Priority Data

Nov. 9, 1984 [GB] United Kingdom ............... 8428412

[51] Int. Cl.$^4$ ............................................. H02P 1/54
[52] U.S. Cl. ..................................... 318/48; 318/161; 318/632
[58] Field of Search .................. 318/48, 161, 45, 60, 318/63, 86, 112, 67, 632

[56] References Cited

U.S. PATENT DOCUMENTS

| | | | |
|---|---|---|---|
| 2,305,816 | 12/1942 | Sonnberger | 318/48 |
| 3,434,025 | 3/1969 | Parkinson et al. | 318/48 X |
| 4,126,818 | 11/1978 | Taylor | 318/48 X |
| 4,323,828 | 4/1982 | Terada et al. | 318/48 X |
| 4,373,147 | 2/1983 | Carlson, Jr. | 318/48 |
| 4,375,047 | 2/1983 | Nelson et al. | 318/48 |

FOREIGN PATENT DOCUMENTS 2042681 2/1979 United Kingdom .

Primary Examiner—Benjamin Dobeck
Attorney, Agent, or Firm—Kerkam, Stowell, Kondracki & Clarke

[57] ABSTRACT

Reaction force compensation means 70 (FIG. 1) for countering the reaction torque of a heavy body, such as rotatable yoke assembly 20, when accelerated relative to flimsily supported body 21 about axis 22, comprises a reaction member 71 rotatable about the, or a parallel, axis 22 and a reaction drive motor 74 coupled to rotate the reaction member by way of velocity step-down gearing 75. In response to acceleration of the body 21 the reaction drive motor 74 accelerates member 71 in the opposite direction producing an equal and opposite reaction torque on the structure. The reaction member is made with a higher moment of inertia about axis 22 than the body and is accelerated at a correspondingly lower rate to give the balancing reaction torque while requiring a smaller mechanical power input than might be expected. The power required of the drive motor is minimized by optimizing the gearing ratio having regard to the moments of inertia of the reaction member and drive motor.

7 Claims, 2 Drawing Figures

REACTION FORCE COMPENSATOR

This invention relates to reaction force compensation and in particular to means for substantially eliminating the reaction force exerted by a body on a supporting structure when accelerated relative thereto.

It is well known for a machine structure to support a drive element such as a motor fixed to the structure and having a movable armature coupled to move a load. When a force is applied by the motor to the load a reaction force equal in magnitude is exerted by the motion in the opposite sense in the support structure.

Steps usually have to be taken to prevent consequential movements of the support structure. Often this is readily achieved by virtue of the weight of the structure and frictional engagement with a machine bed or by normal fixtures. However, it is sometimes required to permit limited movement of the structure, such as when using resilient mountings to damp vibrations within the structure, or where the structure is carried by support means which is required to fulfil other criteria it may be unsuited to carry both the weight of the structure acting vertically and a reaction force possibly acting in a different direction.

Whilst the invention to be disclosed herein is applicable in the widest sense to bodies able to move rectilinearly or rotationally the following description of the invention and the background thereto will in general be restricted to rotation about an axis.

In a machine structure containing a body continuously rotating at a constant speed the angular momentum of the body is constant. Any reaction forces, torques, on the support structure are due to changes in the angular momentum of the body, perhaps due to rotary imbalance, and can be countered by effecting corresponding changes in the angular momentum of a balance shaft rotated with the body. Because the magnitudes of such changes are usually much less than the magnitude of the body momentum the balance shaft may have a much smaller angular momentum requiring little mechanical power to maintain its rotation.

Other sources of change of angular momentum which give rise to reaction torques are friction and variation in the body inertia by changing load. Often a feedback system is employed to measure the reaction torque and cause the application of an opposing compensation torque. Such systems are by their nature complex to implement, depending upon the nature of the system, but again in general provide relatively small reaction torques to compensate for relatively small changes in body momentum.

One example of such an arrangement is shown in UK Patent Application No. 2085637 where a turntable rotating at a nominally constant velocity and possibly coupling motor vibrations to a plinth in the form of reaction torques is coupled to an identical turntable rotating in an opposite direction. The turntables have equal moments of inertia and the speeds are coupled to provide cancelling reaction torques.

Where the body is massive and speed variations are large and/or rapid, for example, if the body is accelerated at a high rate from rest for each movement, then it will be seen that such conventional techniques of duplicating the body by a contra-rotating reaction member would require a large input of mechanical power purely to reproduce the body motion in the reaction member.

Design techniques have evolved to enable energy required for the contra-rotating reaction member to be supplied over a much longer period of time, thereby reducing the input power requirements, by rotating the reaction member as a flywheel and using braking thereof to change its momentum. It will be appreciated that such a technique still requires additional design and construction to accommodate a continuously rotating flywheel and is limited to rotary motion and motion in one direction without further complexity in the way of transmission gearing.

It is an object of the invention to provide for a structure supporting a body accelerated between constant velocities reaction force compensation means which enables adoption of a simple construction with a lower power requirement than hitherto.

According to the present invention a structure supporting a body capable of undergoing acceleration about an axis of the structure includes reaction force compensation means comprising a reaction member supported by the structure for rotation about said axis having a moment of inertia greater than the body, and reaction drive means, responsive to acceleration of the body to accelerate the reaction member about said axis simultaneously with the body in the opposite direction thereto by way of velocity step-down coupling means and at a lower acceleration rate, arranged to produce a rate of change of angular momentum in the compensation means such that the torsional reaction forces of the body and compensation means on the structure are equal and opposite.

Figure 2:
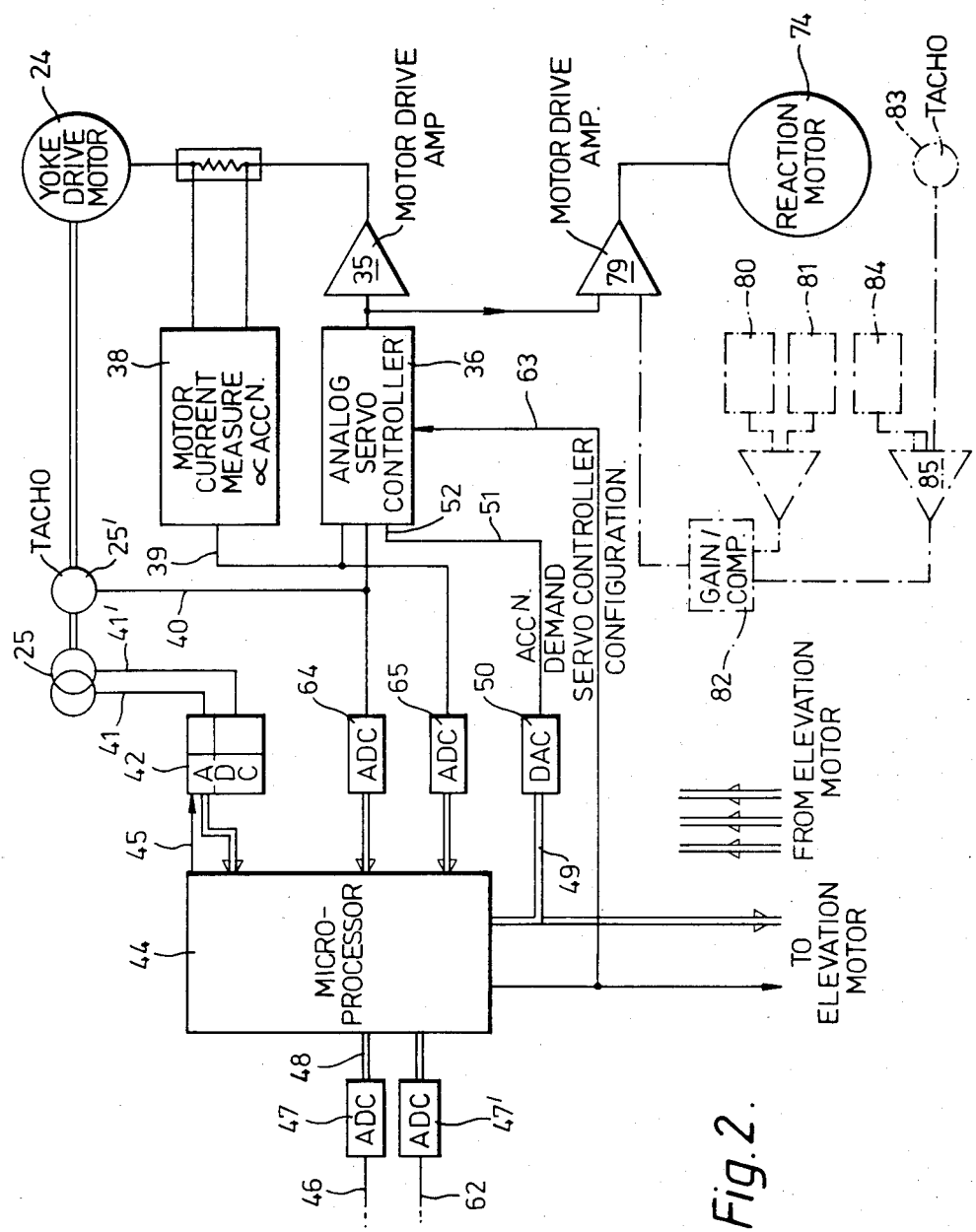

An embodiment of the invention will now be described by way of example with reference to the accompanying drawings, in which:

FIG. 1 comprises a sectional elevation through a structure comprising a radiation path steering system and including reaction force compensation means in accordance with the present invention, and FIG. 2 is a schematic block diagram of the control circuitry associated with movement of the body and reaction compensation means.

In such a radiation path steering system the path may be that of a beam of radiation transmitted from the system and/or the axis of a field of view, or sightline, by which radiation is received. For convenience the following description relates to a sighting system and steering of a sightline.

Referring to FIG. 1 a steerable sighting system 10 is carried by a platform P which may be a moving vehicle. The system is arranged to direct a sightline axis S about a first, nominally vertical, azimuth axis to define a sightline azimuth direction and about a second, nominally horizontal, elevation axis to define the sightline elevation. The system comprises a reflector structure 11, including a plane reflector 12, pivotable about the elevation axis 13 in a yoke 14 by a direct drive elevation motor 15 carried by the yoke and the reflector structure 11. The yoke and reflector structure also carry the relatively movable parts of an angular position sensing transducer 16, which provides signals giving a measure of the angular orientation of the reflector about the elevation axis, and of a tachometer 16' which provides signals representing the angular velocity of the motor. The yoke 14 has a yoke shaft 19 extending therefrom at right angles to the elevation axis 13. This body formed by the yoke 14, shaft 19 and the reflector structure 11 carried thereby may conveniently be called the yoke assembly 20.

The body, or yoke assembly, is supported in a structure comprising a support member 21 mounted on an annular base member 17 by a plurality of legs 18 disposed around the periphery thereof. The support member 21 carries the yoke assembly suspended therefrom by way of the shaft 19 which is supported for rotation about the nominally vertical azimuth axis 22 by bearings 23.

The legs 18 have a minimal thickness in the azimuth direction, that is, in a direction transverse to the radial sightline direction, to minimise obscuration. A plurality of low obscuration bracing elements, such as rods or wires (not shown) extend diagonally between the support member and/or base member and/or legs to provide torsional stiffness to the support member with respect to the platform P about the azimuth axis.

The yoke assembly is driven in rotation about the axis 22 by a motor 24. The motor is direct drive, the stator being carried by the support member 21 and rotor by, and coaxially with, the shaft 19. The support member 21 and yoke assembly also carry the relatively movable components of an angle resolver 25 and a rotation rate sensing tachometer 25'.

The sighting system may conform in essence to the arrangement shown in British patent specifications Nos. 1,491,117 or 1,559,218 in which the reflector structure 11 has a limited rotation about the elevation axis 13, the sightline S extending vertically along the azimuth axis 22 being deflected always to one side of the elevation axis by the reflector such that the azimuth direction of the sightline is determined by rotation of the yoke assembly through a 360° field.

Motor supply and signal connections between the support plate and the yoke assembly reflector structure may be made by slip ring means permitting the yoke assembly unlimited rotation or the rotation may be limited to the order of 360° enabling said electrial connections to be made by way of cables 26 extending along an axial passage 27 of the yoke shaft 19, said cables being clamped to the yoke adjacent one end of the passage and by clamping means 28 to the support member adjacent the other end. The cables are arranged to be unstressed when the yoke assembly is at a datum point in respect of rotation about the azimuth axis. It will be appreciated that the total extent of rotation of the yoke assembly about the azimuth axis 22 is limited by cables 26 but a distance of the order of 10–15 cms. between clamping points is sufficient to permit rotation in excess of ±180° with only tolerable torsional forces applied to the cables.

A system employing cable connection between support plate and yoke assembly may be arranged with the reflector 12 rotatable to a greater extent about the elevation axis 12, being able to be 'flipped' to an equal but opposite inclination with respect to a normal to the azimuth axis causing the sightline along the azimuth axis to be deflected to the other side of the elevation axis and displaced in azimuth by 180°. It will be appreciated that rotation of the yoke assembly may be limited to between 180° and 360°, the above feature enabling the sightline to be directed over the full 360°. Furthermore, relationships can be produced to enable a demanded sightline azimuth direction to be achieved rapidly by combined movement of the yoke assembly in azimuth and reflector in elevation. This particular construction represents only another possible form of yoke assembly comprising the body and beyond that forms no part of the present invention requiring further description. However, details relating to its construction and operation as a sighting system are contained in a copending application.

Irrespective of the yoke assembly variants discussed above it is normally a requirement of a sighting system that the sightline direction be altered rapidly, usually from rest.

To produce such rapid motions the elevation and azimuth motors need to be powerful requiring the yoke assembly construction to be robust. It will be seen that the yoke assembly may readily have a large amount of inertia about the azimuth axis and the torque required from motor 24 to accelerate the yoke assembly causes an equivalent reaction torque in the support plate about the azimuth axis.

By contrast, the legs have minimal dimensions in the direction of yoke assembly rotation and may be subject to defomation by the reaction torque transmitted through the support member 21.

Reaction force compensation means, in this case torque reaction means, is shown generally at 70 in FIG. 1 and comprises a reaction member, or flywheel, 71 supported on the support member 21 by bearings 72 coaxially with the yoke assembly for rotation about the azimuth axis 22, and reaction drive means 73 comprising a drive motor 74 and velocity step-down coupling means 75. The reaction motor 74 is fixed to the support member 21 with its rotational axis 74' parallel to, but displaced from, the azimuth axis 22 and the coupling means comprises a toothed pinion 76, forming a drive member carried by a rotatable shaft 77, of the reaction motor which meshes with a corresponding toothed peripheral face 78 of the reaction member.

In one mode of operation described briefly hereinafter, the rapid motion is achieved by configuring the motor 24 as part of an acceleration servo loop, the yoke assembly being accelerated for part of the rotation towards the new sightline azimuth and decelerated for the remainder. Furthermore the yoke assembly is accelerated from, and brought to, rest for each displacement motion and subsequent motion may be in either sense.

The reaction member 71 has a moment of inertia about axis 22 larger than that of the yoke assembly and is rotated at a slower rate by reacting motor 74 through coupling means 75.

The coupling between the reaction motor 74 and reaction member 71 is a single stage step-down gearing such that the reaction motor rotates in the opposite sense at a higher speed than the reaction member, the ratio being chosen as near as is practicable to that offering maximum reaction for minimum energy input to the motor.

Considering now the rotational motions of the yoke assembly and the reaction member, it will be appreciated that to counter the reaction torque produced in the support member 21 about axis 22, the reaction member must be accelerated about the axis 22 in the opposite rotational sense in synchronism therewith such that the reaction torque exerted by the reaction compensation means, the combination of reaction member and the drive motor, is equal in magnitude to the drive torque provided by the yoke assembly motor 24.

Considering initially that the reaction compensation torque is provided solely by the reaction member, it will be appreciated that the yoke assembly in rotating has an angular momentum $J_Y = I_Y \cdot \omega_Y$, where $I_Y$ is the moment of inertia of the yoke assembly about the axis 22 and $\omega Y$ its angular velocity, and a drive torque $T_Y$, given by the rate of angular momentum $d(J_Y)/dt = T_Y = I_Y \cdot d\omega_Y/dt$.

Similarly it will be seen that for the reaction member 71, the angular momentum $J_R = I_R \cdot \omega_R$ and its rate of change, $T_R = I_R \cdot d\omega_R/dt$.

As stated, the principle of operation is that the reaction torques, or rates of change of momentum inducing them, must balance so that $$d_\omega R/dt = (I_Y/I_R) \cdot d_\omega Y/dt$$

As $I_Y < I_R$ by choice then $d_\omega R/dt < d_\omega Y/dt$ in the same ratio, and after any time t in motion from rest $\omega_R < \omega_Y$ in the same ratio.

Considering the mechanical power input to achieve the rotation, this may be expressed as (torque·angular velocity).

For the yoke assembly this is $T_Y \cdot \omega_Y$ and for the reaction member, $T_R \cdot \omega_R$ and given the above conditions that $T_R = T_Y$ and $\omega_R < \omega_Y$ it will be seen that the mechanical power required to accelerate the reaction member is $\omega_R/\omega_Y$ or $I_Y/I_R$ times the power required to rotate the yoke assembly, $I_Y$, of course, being less than $I_R$.

It will be appreciated that the reaction motor 74 has to provide less mechanical power than the yoke assembly drive motor 24 and consequently may be made a smaller electrical component of lower electrical power rating.

However it will be further appreciated that the motion of the reaction compensation means 70 includes rotation of the reaction motor 74 (including the drive member 75) in the opposite direction to the reaction member 71 and the angular momentum of the reaction motor reduces the effective angular momentum of the reaction member in producing the reaction torque.

Because the motor and reaction member axes 74' and 22 are parallel it does not matter that the angular momentum of the reaction compensation means is divided between the two members rather than concentrated into a single member as the torque is still effected by the rate of change of their combined angular momenta.

It is known that where an electric motor accelerates itself and a load (such as the reaction member) by way of intermediate gearing of ratio n the motor torque $T_M$ accelerates both motor inertia $I_M$ and load inertia $I_L$. The torque referred to the load is $n \cdot T_M$ and the total moment of inertia (referred to the load) $I = I_L + n^2 \cdot I_M$ so that the acceleration of the load is $$d\omega_L/dt = T/I = n \cdot T_M/(I_L + n^2 \cdot I_M) \quad (1)$$

The power delivered to the load is a maximum if the load acceleration is a maximum. By differentiating the expression for $d\omega_L/dt$ with respect to n and equating to zero, a maximum value may be established for $n = (I_L/I_M)^{0.5}$.

When such a motor and load accelerate equal and opposite reaction torques are generated in the structure. The reaction torque due to the motor is given by $$d(\omega_M \cdot I_M) = n \cdot I_M \cdot d\omega_L/dt,$$

referred again to the load, and the reaction torque due to the load given by $I_L d\omega_L/dt$.

The total reaction torque is therefore $$(I_L + n \cdot I_M) \cdot d\omega_L/dt \quad (2)$$

using the above expression (1) for $d\omega_L/dt$ in expression (2), the total reaction torque is given by $$T = (I_L + n \cdot I_M) \cdot n \cdot T_M/(I_L + n^2 \cdot I_M)$$

Differentiating this with respect to n to obtain a maximum gives $$n^2 - 2n - I_L/I_M = 0$$

or $$n = 1 \pm [(I_L/I_M) + 1]^{0.5}.$$

As the single stage of gearing introduces a direction reversal this produces a solution for the optimum value of $$n = [(I_L/I_M) + 1]^{0.5} - 1.$$

In the present apparatus the reaction member comprises the load such that $I_L = I_R'$ and the optimum value of n is given by $n = [(I_R'/I_M) + 1]^{0.5} - 1$.

It will be seen that this is somewhat smaller than suggested by the simple relationship but as the moment of inertia of the reaction member is increased with respect to that of the drive motor, the expression becomes closer to the simple relationship. It is found in practice that the transmitted power varies with gear ratio only slowly for a wide range of values of n so that value for n may be chosen which is substantially optimum while apparently being a long way from the theoretically optimum value. In any event, by the use of a suitable ratio, corresponding to, or near, the optimum value the energy requirements of the reaction motor 74 can be minimised.

It will be appreciated that the drive motor may be coupled to the reaction member by way of coupling means comprising intermediate gearing, the angular momentum of which is taken into consideration. For a single intermediate gear which would rotate in an opposite sense to the drive motor and reaction member, which now rotate in the same sense, the effective moment of inertia $I_R$ comprises $$(I_{R'} + n_M \cdot I_M - n_G \cdot I_G),$$

where $I_G$ is the moment of inertia of the intermediate gear and $n_G$ and $n_M$ are the gear ratios of the gear and drive motor relative to the reaction member, and from which an optimum value of gear ratios n can be determined, although an optimum ratio will generally be higher than for the single step drive considered above.

It will be appreciated that there are practical considerations in respect of the gearing ratio and possibly on the dimensions and rotational rates of the reaction components but a gear ratio of the same order of magnitude as the optimum n should be achievable.

The coupling between the reaction motor pinion and reaction member may be other than meshing teeth, such as frictional contact, and engagement may be other than by an outer peripheral wall with the engagement plane parallel to the azimuth and reaction motor axes.

The reaction motor 74 may also differ from that shown. The reaction motor may be formed coaxially with the yoke shaft 19 and azimuth axis 22 and by means of suitable reduction gearing drive the reaction member by coupling to, or adjacent to, the inner peripheral wall of the reaction member. Alternatively, or in addition, the reaction member may be rotatable about an axis displaced from, but parallel to, the azimuth axis 22 rather than coaxially with it.

As state above one motion required of the yoke assembly in which the reaction compensation means employed is when, to achieve a large yoke assembly rotation, it is accelerated to minimise the time of rotation.

The yoke assembly drive motor 24 is configured in a servo control loop as shown schematically in FIG. 2, which also shows the control arrangement for the reaction motor 74.

The azimuth and elevation motors 24 and 15 essentially have identical control circuitry configuration and to simplify description it is confined to references to the azimuth motor.

The azimuth motor 24 is a d.c. torque motor supplied with drive current by a motor drive means, such as an amplifier 35, under the control of an analog servo control circuit 36 containing conventional components having proportional and/or integrating and/or differentiating transfer functions as is well known in the art.

The current supply from amplifier 35 to the motor is fed by way of low value resistance element 37, across which are connected input leads to an acceleration sensing device in the form of voltage sensing means 38, such as a differential input voltage amplifier, which produces an output signal on line 39 proportional to the current supplied to the motor and thus the torque developed by, and angular acceleration of, the motor.

The tachometer 25' produces a signal on line 40 proportional to the rotation rate of the motor.

The angle resolver 25 comprises a high accuracy synchro with dual windings giving 1 speed (coarse, low accuracy) and 36 speed (fine, high accuracy) outputs on lines 41, 41' connected to separate input channels of a multiplexer/analog-to-digital converter (ADC) 42. The multiplexer/ADC produces digitised motor angle signals on bus 43 connected to an input of digital processing means, conveniently a microprocessor 44, multiplexing signals for switching between channels being provided on a line 45 from the microprocessor.

A sightline azimuth demand signal is applied on line 46 e.g. by manual adjustment of a potentiometer voltage or as an output of other equipment such as tracking radar, to an ADC 47 and thence by input bus 48 to an input port of the microprocessor. An outut bus 49 connected to an output port of the microprocessor provides processed signals to a digital-to-analog converter (DAC) 50, analog output signals of which are connected by line 51 to an input terminal 52 of the servo controller 36.

The microprocessor is of conventional design requiring no further or more specific description and has stored in the storage medium thereof a program through which the CPU processes received signals representing the above discussed angular values in accordance with the predetermined relationships and normal servo control relationships.

The rate and acceleration feedback signals from tacho 25' and acceleration sensor 38 applied to the analog servo controller may be employed in known ways to modify the processing of position error signals.

The analog output of tacho 25' is also applied by way of an ADC 64 to the microprocessor input port and the analog outputs of motor current (acceleration) measuring device 38 is also applied by way of an ADC 65.

The analog servo controller 36 whilst essentially analog in respect of the transfer functions applied to the respective inputs may be configured as to which transfer function is employed by switching means, associated with each transfer function, and operated in accordance with configuration signals received from the microprocessor on line 63.

For instance, the sightline may be caused to track at a demanded rotation rate, the microprocessor 44 providing a rotation data demand signal, by way of DAC 50 to input 52, the servo controller deriving from this and the tacho signal a rate error signal which is applied to motor drive amplifier 35. Similarly the sightline may be caused to rotate at a demanded acceleration rate.

In respect of operation as an angular position feedback servo, the feedback signals from angle resolver 25 are compared with the demand signal in digital form in the microprocessor 44 to produce a position error signal therein which in analog form is applied to the analog servo controller not as a demand signal but as a position error signal which is passed by the controller 36 to the motor drive amplifier.

The microprocessor 44 is programmed however such that when the displacement demanded of the yoke assembly is determined the magnitude is compared with a predetermined threshold limit. If it is below the threshold, the yoke assembly is positioned as described above using feedback from the angle resolver 25. If it is above the threshold the microprocessor establishes a 'fast slew' mode. The microprocessor 44 produces a configuration signal to switch the servo controller to an accleration servo configuration and produces to input 52 thereof an acceleration demand signal. This may be preset being a known fraction of the maximum acceleration of the drive motor. If the maximum is not known an output in excess of possible maximum may be provided initially and the actual maximum received from the means 38. The analog servo controller 36 configured as an acceleration servo responds to feedback signals from the measuring device 38 to drive the azimuth motor 24 exerting a predetermined torque towards the demanded position. The instantaneous angular position as provided by angle resolver 25 is monitored and when the angular position error has been reduced by a preset fraction, say one half, the microprocessor causes an acceleration demand signal to be produced where by the drive current to the motor is reversed to decelerate the motor.

The microprocessor continuously monitors the magnitude of the remaining rotational distance and, by the tachometer 25', the rate of rotation and provides at its output port, and subsequently at controller input 52, an acceleration demand signal which decreases at such a rate that the motor will be brought to rest at the demanded angle. The deceleration rate ($d\omega/dt$) is determined from the motion equation $(d\omega/dt) = -\omega^2/(2\cdot\epsilon)$ where $\epsilon$ is the angular displacement error.

The microprocessor may be programmed with the further step of configuring the servo controller to the 'angle' mode when the remaining distance has been reduced below said threshold level, thereby optimising its response over the final and slower part of the motion.

The reaction motor 74 is shown in FIG. 2 receiving motor acceleration signal from the output of the acceleration-configured servo-controller 36. The motor drive amplifier 79 inverts and amplifies the signals to provide a reaction motor drive current in the opposite sense and proportionally lower than that applied to yoke assembly drive motor 24.

The torque reaction balancing system thus far described is an 'open loop' system in that the current applied to reaction motor 74 is a constant fraction of that applied to the yoke drive motor 24, being a function of the relative inertial masses of the reaction balancing system and the yoke assembly If desired account may be taken of mechanical or environmental imperfections of the arrangement by forming a closed loop control system.

In the sighting system of FIG. 1 described above it is desired to eliminate any relative rotation between the annular base member 17 and the support member 21 about azimuth axis 22.

A simple feedback control loop may be provided by measuring such relative movement and modifying the current supplied to the reaction motor 74.

It will be appreciated that many forms of such measuring apparatus exist although not all may be suitable. For instance, in detecting relative motion displacement sensors are more attractive than rate sensors but can give rise to noise and loop stability problems. Furthermore care is required in introducing integral action into the control loop as this can lead to a non-zero output in a quiescent state with undesirable rotation of the motor. The availability of suitable sensors may further be limited by the need to avoid any obscuration of the sightline. In this respect the sensors may advantageously measure the motion of each member with respect to inertial space, the relative motion being derived from the individual measurements. Suitable forms of sensors which may be used are rate gyros or rate integrating gyros connected to give a rate output.

A schematic block diagram of such a control loop is shown by the broken lines in FIG. 2, transducers 80 and 81 being coupled to the base member 17 and support member 21 respectively. Their outputs are combined and to give a signal representing relative rotation of the members which signal then applied to gain and compensation circuitry at 82 before being added as an input to the motor drive amplifier 79 to modify the reaction motor drive current, received from the controller 36 of the yoke drive motor, and which comprises a feedforward signal for the control loop.

In an alternative form of closed loop control, shown by the additional chain dotted lines in FIG. 2, an additional transducer, such as a tachogenerator 83 is employed to measure the rotation rate of the reaction member 71 and an angle transducer 84, such as an electro-optical displacement sensor, is used to measure the relative angular displacement of base member 17 and support member 21. The displacement and reaction member rotation rate signals are combined with each other at 85 and, via the gain and compensation circuitry 82, combined in turn with the feedforward signal from the yoke drive motor controller 36.

It is re-iterated that as well as the reflector 12 directing received radiation along the azimuth axis 22 onto a detector, radiation may also be transmitted by way of the reflector 12. Also, in addition to optical radiation, that is, in the visible, infra-red or ultra-violet part of the spectrum, the system may employ, or be employed with, longer wavelength microwave radar radiation; that is, the apparatus in general terms relates to the directing of a radiation path axis.

Furthermore the above described elevation and azimuth axes are not constrained to such orientations. For instance the axis 22 may comprise a nominally horizontal elevation axis.

The radiation path axis directing system has also been described as responsive to angular demands received. If the platform p is a moving vehicle the reflector 12 may be stabilised with respect to a desired radiation path axis despite vehicular moments by means of gyro stabilising means (not shown) commonly employed with reflectors pivotable about azimuth and elevation axes. Such gyro-stabilisation means may be carried by the reflector assembly but preferably is carried by the platform p or support member 21 and provides signals to the servo-controlled positioning arrangement whereby the reflector orientation is stabilised in space, as well as directable to demanded radiation path axes.

The above described structure comprising a radiation path steering system in general and a sighting system in particular is only exemplary of a structure including a rotatable body which undergoes accelerating motion and for which torque reaction compensation is required.

The reaction force compensation means described above has been described with respect to an apparatus having a body which is usually rotated from rest to rest. It will be appreciated that there compensation means is equally applicable where the body accelerates from speeds other than zero.

It will be understood that the rotatable yoke assembly may be any body in a system used for other purposes or with other reasons for requiring torque reaction compensation.

I claim:

1. A structure supporting a body capable of undergoing acceleration about an axis of the structure including reaction force compensation means comprising a further axis through the structure extending in the same direction as the axis about which the body can accelerate, a reaction member, having a moment of inertia greater than the body, supported by the structure for rotation about said further axis, reaction drive means, responsive upon acceleration of the body to accelerate the reaction member independent of, and simultaneously with, the body in the opposite direction thereto and velocity step-down coupling means disposed between the reaction member and reaction drive means to rotate the reaction member at a lower acceleration rate than the body, said reaction drive means being arranged to produce a rate of change of angular momentum in the compensation means such that the torsional reaction forces of the body and compensation means on the structure are equal and opposite.

2. A structure as claimed in claim 1 in which the reaction drive means includes a motor rotatable about a drive axis also at least parallel to said axis and having a smaller moment of inertia than the reaction member, the step-down coupling means having a ratio which is a function of the moments of inertia of the reaction member and reaction drive means requiring substantially minimum power consumption by the motor.

3. A structure as claimed in claim 2 in which the motor has a drive member coupled for direct rotation therewith and peripherally engaging a circumferentially extending surface of the reaction member such that they rotate in opposite senses about their respective axes and the angular momentum of the compensation means comprises the difference between that of the reaction member and that of the drive motor, said coupling ratio n being substantially equal to the theoretically optimum ratio for minimum loss $[(I_{R'}/I_M)+1]^{0.5}$ −1 where $I_{R'}$ is the moment of inertia of the reaction member and $I_M$ is the moment of inertia of the reaction drive motor.

4. A structure as claimed in claim 3 in which the engagement between drive member and reaction member is by way of meshing gear teeth.

5. A structure as claimed in claim 2 in which the body is accelerated by an electric motor and in which the reaction force compensation means includes means to apply a constant function of the body-accelerating motor current as a feedforward current to drive the motor of the reaction drive means.

6. A structure as claimed in claim 5 including transducer means operable to measure twisting of the structure about said axis and produce an electrical signal relating thereto and signal combining means operable to combine the transducer signal with the feedforward current to modify the current supplied to the motor of the reaction drive means.

7. A structure as claimed in claim 6 in which the transducer means is operable to measure twisting of the structure as a displacement across it and further includes tachogenerator means operable to measure the rotation rate of the reaction member, the signals of the tachogenerator and displacement transducer means being combined in order to provide a signal for modifying the feedforward current applied to the motor of the reaction drive means.

* * * * *